E. B. CAMPBELL.
JOURNAL BEARING SUPPORT.
APPLICATION FILED NOV. 29, 1918.

1,356,037. Patented Oct. 19, 1920.

INVENTOR,
Edward B. Campbell,
BY
H. M. Plaisted,
ATTORNEY.

UNITED STATES PATENT OFFICE.

EDWARD B. CAMPBELL, OF ST. LOUIS, MISSOURI, ASSIGNOR TO WILLIAMS PATENT CRUSHER & PULVERIZER CO., OF ST. LOUIS, MISSOURI, A CORPORATION OF MISSOURI.

JOURNAL-BEARING SUPPORT.

1,356,037.  Specification of Letters Patent.  Patented Oct. 19, 1920.

Application filed November 29, 1918. Serial No. 264,610.

*To all whom it may concern:*

Be it known that I, EDWARD B. CAMPBELL, a citizen of the United States, residing at St. Louis, State of Missouri, have invented certain new and useful Improvements in Journal-Bearing Supports, of which the following is a specification.

This invention relates to certain new and useful improvements in journal bearing supports, the peculiarities of which will be herein after described and claimed.

The main object of my invention is to provide a journal bearing support that is adapted to allow the ready assembling and dismounting of the rotor shaft of a machine on which my device is used, and to allow of the minimum amount of machine work.

Figure 1:
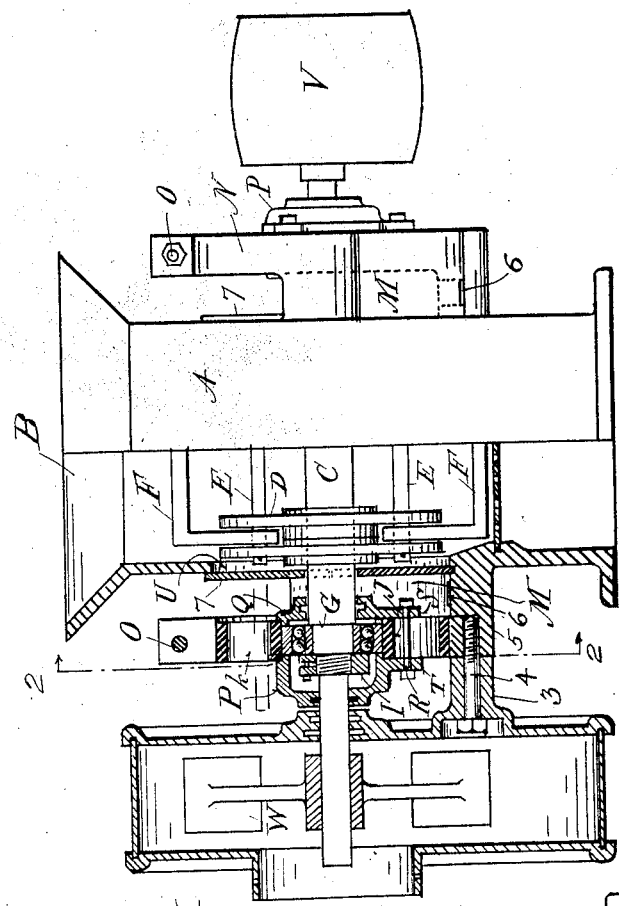
Figure 2:
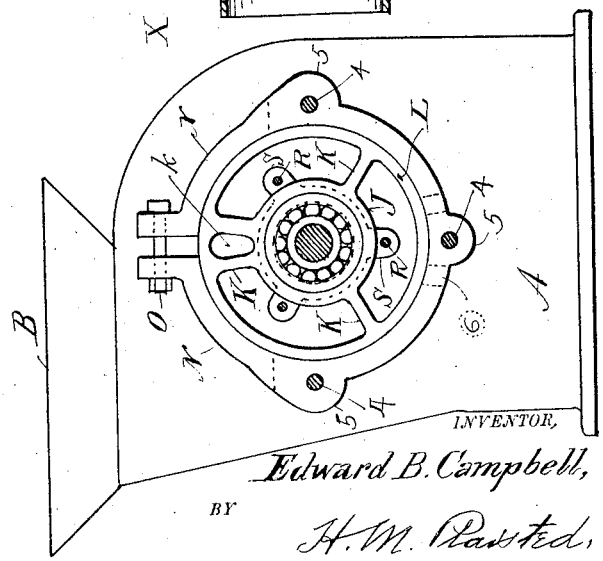

In the accompanying drawing on which like reference letters indicate corresponding parts, Figure 1 represents a half front elevation and half sectional elevation of a reducing machine illustrating my improvements; and Fig. 2 a sectional side view of said improved machine taken on the line 2—2 of Fig. 1.

A designates the casing of a reducing machine of any suitable variety and B the hopper of the same. C designates a horizontal rotor shaft mounted in said casing and having disks D having openings through which slide hammer rods E on which are mounted stirrup hammers F, constituting the rotor of said machine. At suitable points of said shaft outside of the casing, a turned down portion forming a shoulder G, engages a ball bearing of any suitable construction that is held against said shoulder by a jam nut I.

Surrounding and embracing this ball bearing is a housing consisting of an inner ring J, and radiating arms K that are preferably connected by a complete outer ring L, thus forming a double ring or skeleton housing for said ball bearing. The said housing constitutes the inner member of a journal bearing support,—the outer member being compressible upon the outer ring or arms of said housing so as to clamp the housing, ball bearing, shaft, and adjacent parts, in proper operative position with regard to said casing. The outer ring L connecting the ends of the arms K radiating from the middle ring, may be omitted.

This outer member comprises a circular portion, the lower half of which is connected by a web M with the side of the casing preferably cast integrally therewith. The upper portion consists of two converging horns N separated from the casing as shown in Fig. 1, and provided with a bolt O or other means by which said horns may be compressed to such a degree that the said ball bearing housing, embraced by the circular portion, will be clamped securely therein.

Suitable glands P and Q inclose the outside and inside of said ball bearing respectively, and are clamped against the inner ring J of the housing by means of bolts R connecting corresponding lugs S and T of the inner and outer glands respectively, by passing through the open spaces outside of the ring J and between the radiating arms K of the skeleton housing.

It will be observed from the drawing and the above description, that the rotor shaft may be provided with hammers and hammer mounts, and that the ball bearings may be located against the shoulder G in each case, and the housing engage with and surround the said ball bearing, and that the said glands P and Q may likewise be mounted on the shaft and bolted together as above described, and that the whole assembly so far described as constituting the rotor, may be slipped within said casing A through a suitable side opening U, and the housing for each bearing may be clamped in its desired position within the outer member of the journal bearing support at each side of the casing.

Fig. 1 shows a driving pulley V mounted on one end of the rotor shaft, and on the other a fan W within a suitable fan casing X. This fan casing has projecting thimbles 3 with openings for bolt 4, and said bolts,—preferably three in number as shown,—enter corresponding registering holes in enlargements or bosses 5 of the web M or rigid portion of the compressible outer member of the journal bearing support.

The casing X is therefore firmly mounted by said bolts 4 in its proper position with regard to the fan.

Since the said web M and circular portion of the outer member form a pocket around the opening U of the mill casing, I have provided openings 6 in the bottom of said web M to allow the escape of oil or other matter that may enter said pocket.

The opening U in the mill casing is provided with a split cover 7 secured in any suitable manner to the said casing. The web M projects laterally from each side of the mill casing adjacent to said opening U, so as to locate the clamping member of the journal bearing support a suitable distance away from the side of the casing, as required by insurance bureaus.

The open spaces between the arms K, and particularly the opening k at the top of the skeleton housing, allows of sliding the hammer rod out endwise, as indicated by dashed lines in Fig. 1.

I claim:

1. The combination with a journal bearing, of a skeleton housing embracing said bearing, glands on both sides of said bearing and skeleton housing, bolts passing through the openings in said skeleton housing and connecting said gland, and an outer clamping member supporting said housing and its contents.

2. The combination with an outer compressible member and a bearing, of an interposed housing consisting of an outer ring engaging said compressible member and an inner ring embracing said bearing and having arms connecting said outer and inner rings and forming a skeleton housing, substantially as described.

3. A journal bearing support comprising a laterally projecting web with a fixed point of attachment, a compressible bearing support opposite the point of attachment, a journal bearing, and a ring within the bearing support and surrounding the bearing.

4. In combination with a journal bearing, a support comprising an outer compressible member provided with a laterally projecting web, said web having a point of attachment opposite said member, and a housing within the compressible member and embracing the bearing.

5. In combination with a casing, a journal bearing support comprising a laterally projecting semicircular web secured to the casing and compressible horns opposite said web, means for compressing said horns, a journal bearing, and a ring within the bearing support and surrounding the bearing.

In testimony whereof I have affixed my signature in the presence of two witnesses.

EDWARD B. CAMPBELL.

Witnesses:
  H. M. PLAISTED,
  A. M. OBRECHT.